United States Patent
Choudhury (10) Patent No.: US 9,436,487 B2
(45) Date of Patent: Sep. 6, 2016

(54) METHOD AND APPARATUS FOR CREATING A PLATFORM AGNOSTIC APPLICATION FILE

(75) Inventor: Rajorshi Ghosh Choudhury, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 36 days.

(21) Appl. No.: 13/433,756

(22) Filed: Mar. 29, 2012

(65) Prior Publication Data

US 2013/0263103 A1 Oct. 3, 2013

(51) Int. Cl.
*G06F 9/44* (2006.01)
*G06F 9/445* (2006.01)

(52) U.S. Cl.
CPC ....... *G06F 9/44526* (2013.01); *G06F 9/44542* (2013.01)

(58) Field of Classification Search
CPC .............................. G06F 9/44; G06F 9/44526
USPC .......................................................... 717/163
See application file for complete search history.

(56) References Cited

U.S. PATENT DOCUMENTS

| | | | | |
|---|---|---|---|---|
| 6,438,744 B2* | 8/2002 | Toutonghi | ..................... | 717/106 |
| 6,745,385 B1* | 6/2004 | Lupu | ................... | G06F 9/44521 717/148 |
| 6,948,164 B2* | 9/2005 | Tinker | ...................... | G06F 8/65 717/163 |
| 7,458,073 B1* | 11/2008 | Darling | ..................... | G06F 8/67 717/122 |
| 8,291,401 B2* | 10/2012 | Gray | .................. | G06F 9/44521 717/122 |
| 2006/0080682 A1* | 4/2006 | Anwar | ................ | G06F 9/44521 719/331 |
| 2009/0024925 A1* | 1/2009 | Stevens | ................ | G11B 27/034 715/716 |
| 2010/0050165 A1* | 2/2010 | Chen | ................... | G06F 9/45516 717/162 |
| 2011/0321022 A1* | 12/2011 | Soundrapandian | ..... | G06F 9/547 717/163 |
| 2012/0215831 A1* | 8/2012 | Urbach | ............... | G06F 9/44573 709/203 |
| 2012/0233631 A1* | 9/2012 | Geshwind | .......... | H04N 21/2547 725/1 |
| 2013/0174124 A1* | 7/2013 | Watters et al. | ............... | 717/122 |
| 2013/0263103 A1* | 10/2013 | Choudhury | ......... | G06F 9/44542 717/163 |
| 2013/0275955 A1* | 10/2013 | Agarwal | ................. | G06F 8/452 717/163 |

OTHER PUBLICATIONS

Levine, Shared Libraries, iecc.com (Jun. 15, 1999) retrieved from http://www.iecc.com/linker/linker09.html on Apr. 2, 2015.*
Adobe, Developing ActionScript Extensions for Adobe AIR, Adobe (2010) retrieved from http://www.adobe.com/content/dam/Adobe/en/devnet/devices/pdfs/DevelopingActionScriptExtensionsForAdobeAIR.pdf on Nov. 2, 2015.*

(Continued)

*Primary Examiner* — Jason Mitchell
*Assistant Examiner* — Theodore Hebert
(74) *Attorney, Agent, or Firm* — Keller Jolley Preece (57) ABSTRACT

A method and apparatus for creating an application file comprising accessing at least one library, stubbing the at least one library to create a stub library containing symbols exported from the at least one library, and packing the stub library into the application file. Other embodiments include method and apparatus for packaging an application file comprising accessing the application file, unpacking the application file to expose at least one stub library, accessing the at least one stub library and packaging the application file with another application using symbols contained in the stub library for delivery to an end user computer.

20 Claims, 4 Drawing Sheets

(56) References Cited

OTHER PUBLICATIONS

Boudreau, Java Card Development Quick Start Guide, NetBeans (Feb. 4, 2010) retrieved from http://netbeans.org/kb/docs/javame/java-card.html on Dec. 27, 2015.*

"Deliver rich applications beyond the browser across platforms and devices" from web site htts://www.adobe.com/products/air.html?promoid=DINNX on Sep. 12, 2012, 2 pages.

* cited by examiner

METHOD AND APPARATUS FOR CREATING A PLATFORM AGNOSTIC APPLICATION FILE

BACKGROUND OF THE INVENTION

1. Field of the Invention

Embodiments of the present invention generally relate to software application development and, more particularly, to a method and apparatus for development of applications using disparate development platforms.

2. Description of the Related Art

Modern software development is performed using many software developers working on various hardware/software platforms to develop a software application. Each platform has dedicated Software Development Kit (SDK) to facilitate development of executable code (also referred to herein as software application or software application upon a particular platform. For example, an application for iOS may be initially developed using an Apple computer, Mac OS, and an Apple-based SDK. The application may be subsequently transferred to another developer for inclusion as a plug-in or extension of a larger application, testing and the like. The second developer may work on, for example, a WINDOWS platform using a WINDOWS-based SDK to package the extension with the larger application. As a result, for example, an extension developed on an APPLE computer may ultimately be included in a larger application being developed on a WINDOWS platform and ultimately executed on a third computer, e.g., APPLE computer.

To facilitate functionality across the various platforms, the initial (first) developer may create multiple versions of the software where each version functions on a different platform. Another alternative is to create one software application and design the ability to link to a different library associated with each platform. As such, the application would be packaged with a plurality of libraries (at least one library for each supported platform).

Therefore, there is a need in the art for improved method and apparatus for development of applications capable of operating across different platforms.

SUMMARY OF THE INVENTION

Embodiments of the present invention generally relate to a method and apparatus for creating an application file comprising accessing at least one library, stubbing the at least one library to create a stub library containing symbols exported from the at least one library, and packing the stub library into the application file.

Another embodiment of the present invention generally relates to a method and apparatus for packaging an application file with another application comprising accessing the application file, unpacking the application file to expose at least one stub library, accessing the at least one stub library, packaging the application file with another application using symbols contained in the stub library for delivery to an end user computer.

While the method and apparatus is described herein by way of example for several embodiments and illustrative drawings, those skilled in the art will recognize that the method and apparatus for creating executable code is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for creating a platform agnostic executable code defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for creating an application file. Specifically, embodiments of the present invention disclose design and implementation of a method and apparatus for creating a platform agnostic application file. In an embodiment, a method for creating the application file comprises accessing a library and stubbing the library to create a stub library. In some embodiments, more than one library can be stubbed to create more than one stub library. More specifically, the at least one stub library contains symbols that are exported from a library. The method further comprises packing the stub library into an application file (e.g., an extension file) and, optionally, compressing the application file. Such a compressed application file can be decompressed, unpacked and used to package the application file with another application (referred to herein a master application) located on a platform that is different from the platform used to create the application file. Consequently, the process to package the application file with the master application is platform agnostic. The package (master application and the application file) may then be executed on a third platform. In this manner, the packaging platform does not require the library represented by the stub library to complete the packaging process. Thus, packaging may be accomplished in a platform agnostic manner.

Various embodiments of an apparatus and method for creating and/or consuming an application file are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
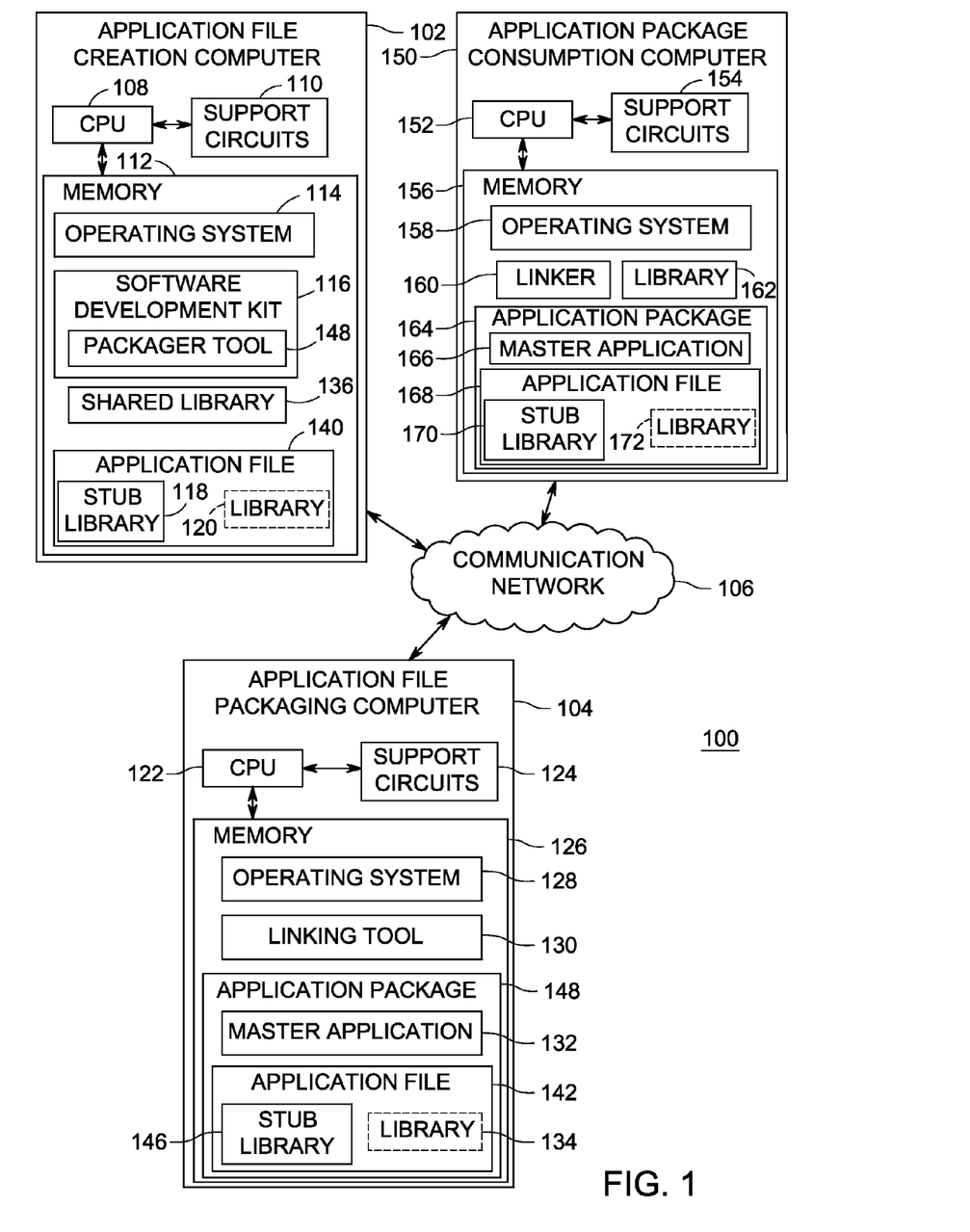
FIG. 1 depicts a block diagram of a computing system for creating platform agnostic application file, according to one or more embodiments.

FIG. 1 depicts a block diagram of a computing system 100 facilitating implementation of a method for creating a platform agnostic application file through deployment of an apparatus, according to one or more embodiments.

The apparatus is usable for practicing methods for development and execution of a platform agnostic application file, designed and implemented in conformity with the principles of the present invention. Details of the apparatus have been disclosed herein with respect to FIGS. 1 and 5, whereas the methods implemented using the apparatus are disclosed with reference to FIGS. 2 and 4.

The computing system 100 comprises an application file creation computer 102, an application file packaging computer 104, an application package consumption computer 150 and a network 106. The computing system 100 facilitates deployment of the apparatus for development and execution of platform agnostic application files, in particular, extension files, in accordance with the certain principles of the present invention. In accordance with various embodiments, an application file (e.g., an extension) is developed on the application file creation computer 102, transferred to the application file packaging computer 104, where the application file is packaged with another application (i.e., referred to herein as the master application file) without regard to the type of platform used in packaging, and ultimately, the packaged files are executed on the application package consumption computer 150 (e.g., an end user computer).

Application creation computer 102 is a type of computing device (e.g., a laptop, a desktop, a Personal Digital Assistant (PDA), a tablet, a mobile phone and/or the like) known to one of ordinary skill in the art. The application creation computer 102 comprises a first Central Processing Unit (CPU) 108, a first set of support circuits 110, and a first memory 112. The first CPU 108 may comprise one or more commercially available microprocessors or microcontrollers that facilitate data processing and storage.

First set of support circuits 110 facilitate the operation of the first CPU 108 and include one or more clock circuits, power supplies, cache, input/output circuits, and the like.

First memory 112 comprises at least one of Read Only Memory (ROM), Random Access Memory (RAM), disk drive storage, optical storage, removable storage and/or the like. The first memory 112 comprises a first operating system (OS) 114, a Software Development Kit (SDK) 116, a shared library 136 and an application file 140 comprising, for example, stub library 118, and, optionally at least one library 120.

By way of example, and in no way limiting the scope of the invention, in certain specific embodiments, the SDK 116 may comprise one or more APIs, one or more libraries, documentation, a packager tool 148, a compiler, linker and editor.

SDK 116 facilitates creation of one or more application files e.g., application file 140, in accordance with the present invention. The term "Software Development Kit" or "SDK" or "devkit", as used herein, refers to a set of development tools that allows for the creation of applications for a certain software package, software framework, hardware platform, computer system, video game console, operating system, or similar platform. Specifically, the SDK may be something as simple as an Application Programming Interface (API) in the form of some files to interface to a particular programming language or include sophisticated hardware to communicate with a certain embedded system. Common tools include debugging aids and other utilities often presented in an integrated development environment (IDE). In one embodiment, the SDK 116 comprises a packager tool 148 for creating the stub library 118 and creating the application file 140 in accordance with the invention.

The stub library 118 contains one or more symbols, exported from a shared library 136. A stub library is generally used for linking purposes and contains only exported symbols without executable code. The shared library 136 is a standard library that is known to exist on the application package consumption computer 150. Although a single stub library 118 is shown, the application file may comprise a plurality of stub libraries. The stub library 118 and the one or more symbols contained therein enable a linking tool to statically use the symbols, without the use of an SDK.

In use, the stub library 118 is created and added to the application file 140. Typically, but not necessarily, the application file 140 is compressed and stored for later use. In alternative embodiments, at least one additional library 120 may be added to the application file 140, where the additional library 120 is operative on both the application creation computer 102, the application file packaging computer 104 and the application package consumption computer 152. In one embodiment, the additional library 102 is a unique library created by the application file developer. The application file 104 operates as a container for stub and non-stub libraries that form the extension to be packaged on a second platform with a master application 132 and, ultimately, used on a third platform.

The term "Shared library or shared object", as used herein, refers to a file that is intended to be shared by executable files and further shared objects files. Modules used by a program are loaded from individual shared objects into memory at load time or run time, rather than being copied by a linker when it creates a single monolithic executable file for the program. Shared libraries can be statically linked, meaning that references to the library modules are resolved and the modules are allocated memory when the executable file is created.

Typically, most modern operating systems can have shared library files of the same format as the executable files. This offers two main advantages: firstly, it requires using only one loader, rather than two. Secondly, it allows the executable files to be used as shared libraries, if they have a symbol table. For example, typical combined executable and shared library formats are Executable and Linkable Format (ELF) and Mach-O, both in Unix, and PE (Windows).

To facilitate further development, testing, packaging and/or the like, the application file 140 (whether compressed or uncompressed) is transmitted from the application creation computer 102 to the application packaging computer 104 through the network 106. In its simplest form, the application file (e.g., an extension file) contains only the stub library. In other embodiments, the application file may contain additional libraries (unstubbed) that are created by the application file developer.

Network 106 comprises equipment and cabling for transporting digital data between computers. By way of example, and in no way limiting the scope of the invention, in certain embodiments, the network 106 may comprise multiple routers and switches (not shown) that transport traffic between the application creation computer 102 and the application consumption computer 104 and to the Internet. Network 106 is in one embodiment, a communication network and may run the Internet Protocol (IP) suite. However, in other embodiments, the network 106 may be a portable storage device, e.g., disk drive, solid state memory, and/or the like, that facilitates moving the application file 140, or a copy thereof, from the application creation computer 102 to the application packaging computer 104 and, ultimately, to the application package consumption computer 150. As such, the application creation computer 102 is communicably coupled to the application packaging computer 104 via the network 106.

Application packaging computer 104 is a type of computing device (e.g., a laptop, a desktop, a PDA, a tablet, a mobile phone and/or the like) known to one of ordinary skill in the art. The application packaging computer 104 comprises a second CPU 122, a second set of support circuits 124, and a second memory 126. The second CPU 122 may comprise one or more commercially available microprocessors or microcontrollers that facilitate data processing and storage.

Second set of support circuits 124 facilitate the operation of the second CPU 122 and include one or more clock circuits, power supplies, cache, input/output circuits, and the like.

Second memory 126 comprises at least one of ROM, RAM, disk drive storage, optical storage, removable storage and/or the like. The second memory 126 comprises a second OS 128, a linking tool 130, a master application 132 and an application file 142 (a copy of application file 140) containing stub library 146, and an optional library 134 or a plurality of libraries.

In one embodiment, the application consumption computer 104 receives an application file 142 from the application creation computer 102, via the network 106. In one embodiment, the master application 132 is designed to attach to or otherwise utilize the application file 142 as, for example, an extension or plug-in.

The linking tool 130 accesses the compressed application file 142. The linking tool 130 decompresses, as necessary, and unpacks the application file 142. The linking tool 130 accesses the stub library 146 and uses the stubs (symbols) to link the application file 142 to the master application 132. In one embodiment, the master application 132 consumes the application file (extension) to add functionality to the master application. Using embodiments of the present invention enables the extension functionality to be created on any platform and then packaged on another platform without regard to the type of platform, Application package consumption 150 computer 104 is a type of computing device (e.g., a laptop, a desktop, a PDA, a tablet, a mobile phone and/or the like) known to one of ordinary skill in the art. The application package computer 150 comprises a second CPU 152, a second set of support circuits 154, and a second memory 156. The second CPU 152 may comprise one or more commercially available microprocessors or microcontrollers that facilitate data processing and storage.

Second set of support circuits 154 facilitate the operation of the second CPU 152 and include one or more clock circuits, power supplies, cache, input/output circuits, and the like.

Second memory 156 comprises at least one of ROM, RAM, disk drive storage, optical storage, removable storage and/or the like. The second memory 156 comprises a third OS 158, a linker 160, library 162, and an application package 164. The application package 164 comprises a master application 166 and an application file 168 (a copy of application file 140) containing stub library 170, and an optional, at least one library 172.

In one embodiment, the application package consumption computer 150 receives an application package 164 from the application packaging computer 114, via the network 106. In one embodiment, upon installation and execution, the master application 166 is designed to attach to or otherwise utilize the application file 168 as, for example, an extension or plug-in.

The linker 160 accesses and unpacks the application package 164. In one embodiment, the master application 166 consumes the application file (extension) 168 to add functionality to the master application 160. The installation and execution of the applications contained in the application package 164 is conventional and well-known to those skilled in the art.

Figure 2:
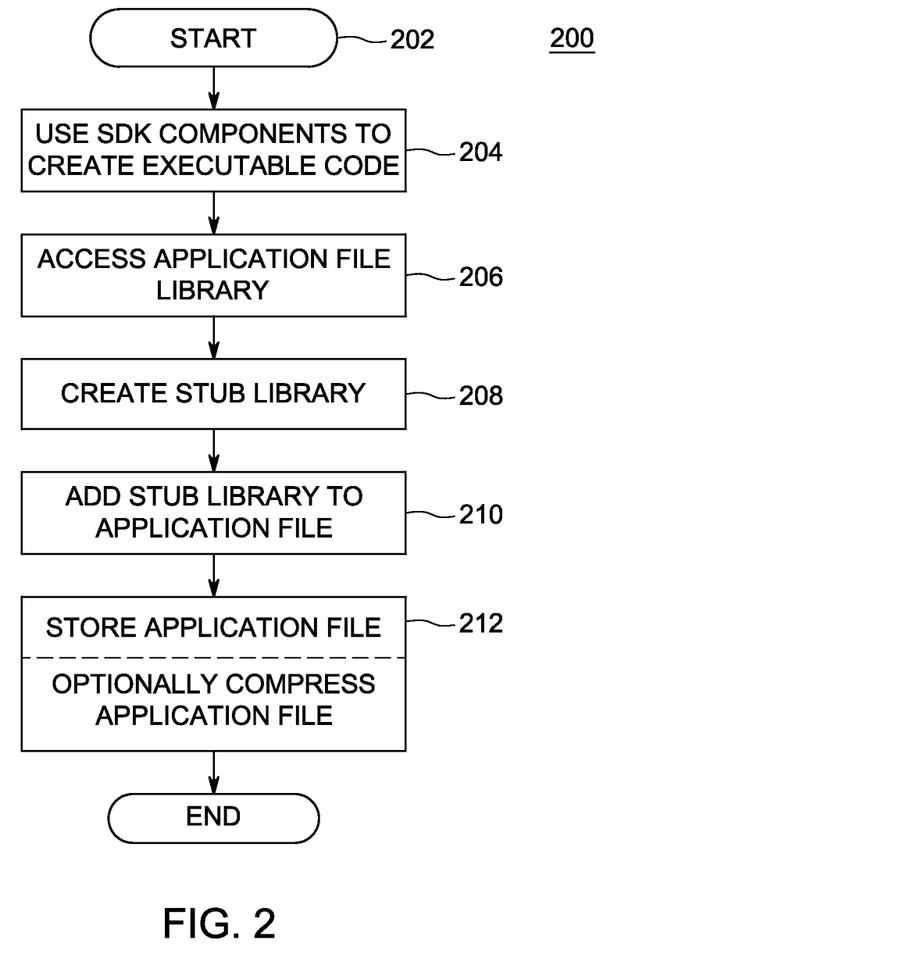
FIG. 2 depicts a flow diagram of a method for creating the application file through an exemplary implementation of a Software Development Kit of FIG. 1, according to one or more embodiments.

FIG. 2 depicts a flow diagram of a method 200 for creating an application file through an exemplary implementation of the Software Development Kit of FIG. 1, according to one or more embodiments.

The method 200 starts at step 202 and proceeds to step 204, where the method 200 uses one or more components of the SDK to create the application file (140 in FIG. 1). As discussed in conjunction with FIG. 1, the SDK comprises one or more components, for example one or more APIs, one or more libraries, documentation, a packager tool, a compiler, linker and editor.

At step 206, the method 200 accesses one or more libraries. By way of example, and in no way limiting the scope of the invention, in certain embodiments, the one or more libraries are provided by the SDK. Further, the one or more libraries may constitute a shared library.

At step 208, the method 200 creates one or more stub libraries based on the one or more libraries. The stub library contains one or more symbols that are exported from the one or more libraries. Specifically, the method 200 specifies the dependencies required when linking to the library (static library). The method 200 generates the stubs for all symbols exported from each of the dependencies and creates the stub library.

At step 210, the method 200, using the packager tool, adds the created stub library and, optionally, at least one library (non-stubbed) to the application file. The additional non-stubbed library is a library that is known to be available to the master application on the application consumption computer.

At step 212, the method 200 stores the application file, for later use. In certain embodiments, the application file may be compressed using at least one of data compression algorithms generally known in the art. For example, and by no way of limitation, the lossless data compression algorithm is that used in connection with a ZIP file format.

The method 200 ends at step 212.

Figure 3:
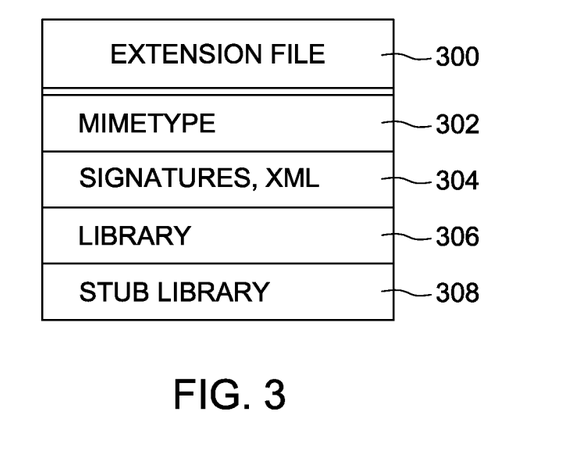
FIG. 3 depicts a representation of an exemplary application file in the form of an extension file that utilizes a stub library that is created using the method of FIG. 2, according to one or more embodiments.

FIG. 3 depicts a schematic representation of an exemplary form of an application file, an extension file 300, containing a stub library, according to one or more embodiments.

Exemplary extension file 300 comprises a mimetype 302, signatures.xml 304, a library 306 (optional), and a stub library 308.

The signatures.xml 304 comprises data or information used to authenticate the extension. The digital signature can be created by the extension developer by hashing the extension without the digital security signature, and encrypting the hash with a private encryption key. The digital security signature can later be decrypted using the extension developer's public encryption key and comparing that to a hash of the extension without the digital security signature. If the two hashes match, it can be concluded that the copy of the extension is valid and unaltered.

Certain embodiments of the present invention provide methods for consumption of application files (e.g., extension file 300) and apparatuses used therefor, designed and implemented in accordance with the principles of the invention. In certain such embodiments, a method for consuming an application file comprises accessing the application file, decompressing (as needed) and unpacking the application file, accessing the stub library contained therein and using the stubs to link to the master application. As such, a functional extension can be created on one platform and packaged with a master application on another platform without regard to the type of platform used for performing the packaging.

Figure 4:
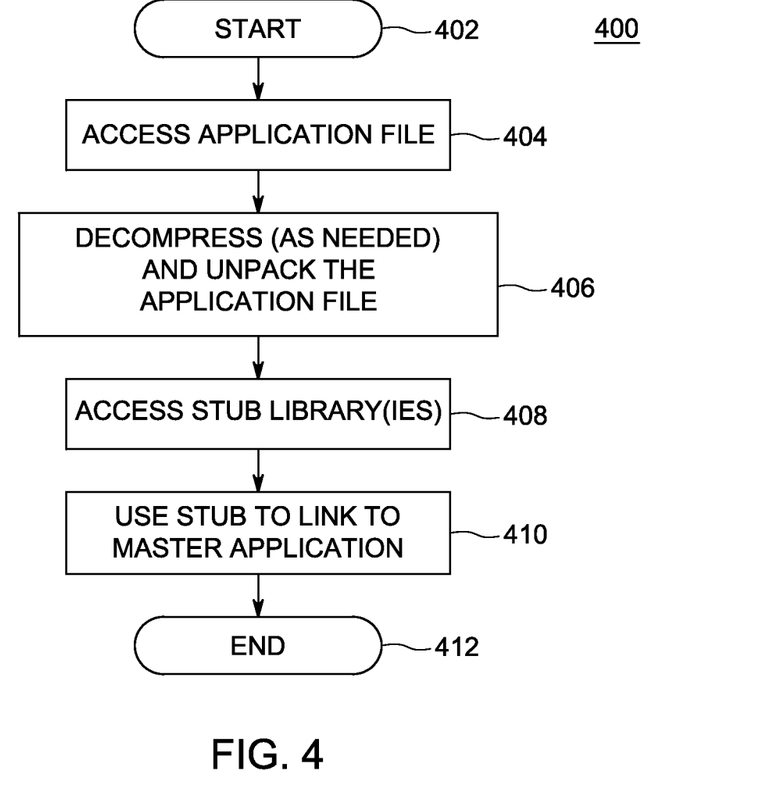
FIG. 4 depicts a flow diagram of a method 400 for packaging an application file and utilizing the application file within a final master application as an exemplary implementation of the application file of FIG. 1, according to one or more embodiments.

FIG. 4 depicts a flow diagram of a method 400 for packaging an application file and utilizing the application file within a final master application as an exemplary implementation of the application file of FIG. 1, according to one or more embodiments. In one embodiment, the method 400 may be executed as a component of Adobe® AIR® to facilitate packaging applications and extensions that are developed upon disparate platforms.

The method 400 starts at step 402 and proceeds to step 404, where the method 400 accesses the application file. In certain embodiments, the method 400 further comprises receiving the compressed application file from the application creation computer over the network to consume the application file contained therein.

At step 406, the method 400 decompresses (as needed) and unpacks the application file to access the stub library contained therein.

At step 410, the method 400 uses the stub library and the stubs or (symbols) to statically link or couple to the master application to add additional functionality to the master application. In certain specific embodiments, the method 400 uses the linking tool to access the stub library and uses the stubs to link to the master application on the consumption computer. A final master application may be created in this manner by consuming a meriad number of application files (extensions) created on any number of disparate platforms.

The method 400 ends at step 412.

In one embodiment of the invention, the final master application may be transferred to a user computer (e.g., application package consumption computer 150 of FIG. 1) for execution.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
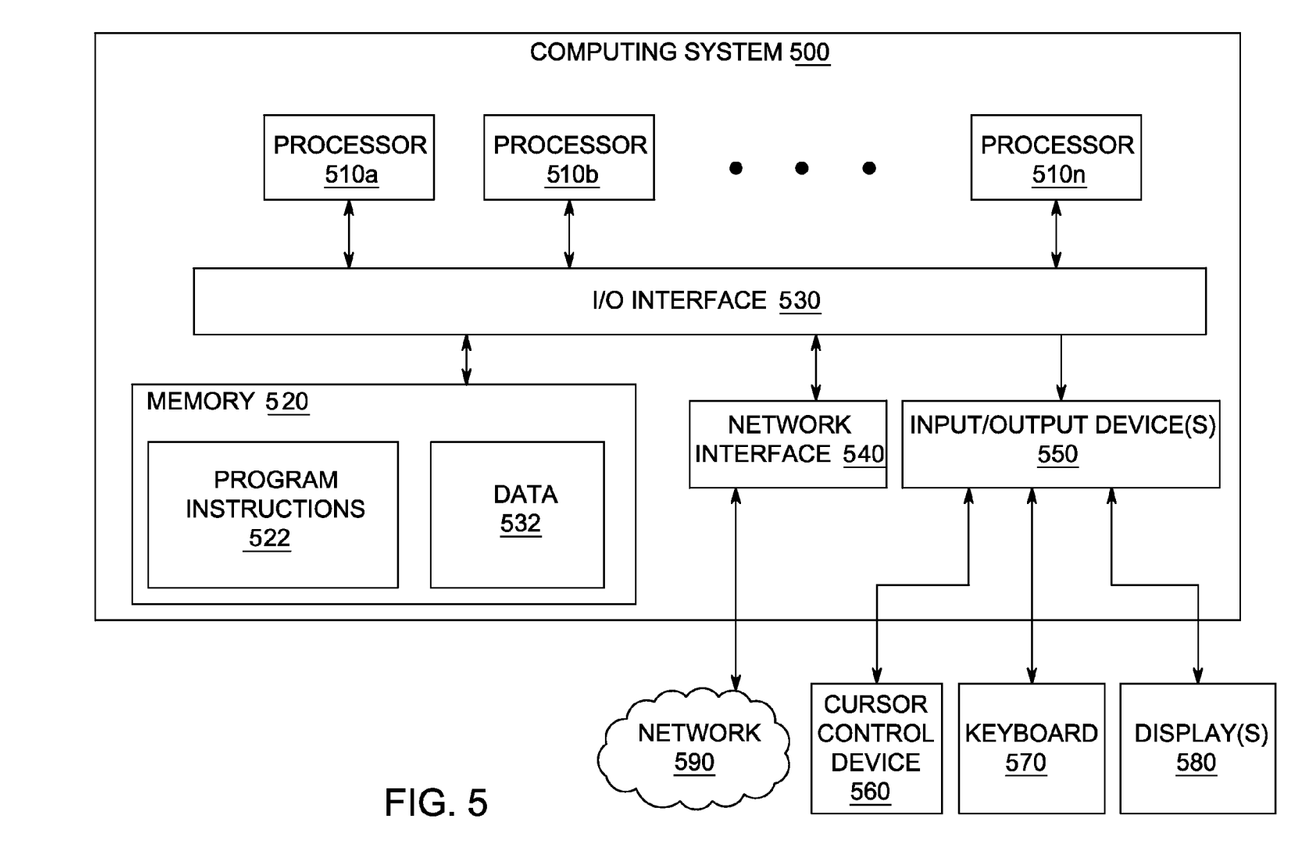
FIG. 5 depicts a computer system that can be utilized in various embodiments of the present invention to implement the methods of FIG. 2 and/or FIG. 4, according to one or more embodiments.

FIG. 5 depicts a computer system that can be utilized in various embodiments of the present invention, according to one or more embodiments.

Various embodiments of an apparatus and method for creating a platform agnostic application file, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200 and 400, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. The computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 2 and 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method of creating an application package for an application consumption computer comprising:
    creating, by a file creation computer using a first platform, an application file;
    accessing, by the file creation computer, a shared library;
    identifying one or more dependencies required when linking a master application created on a second platform to the shared library;
    generating, by at least one processor of the file creation computer, a stub for each of the identified one or more dependencies;
    creating, from the generated stubs by the file creation computer, a stub library including symbols exported from the shared library for each of the identified one or more dependencies;
    combining, by the at least one processor of the file creation computer, the application file created using the first platform and the stub library including the symbols exported from the shared library into a platform agnostic application file that allows a packaging computer, using the second platform and lacking the shared library represented by the stub library, to package the platform agnostic application file with the master application; and
    providing the platform agnostic application file including the combined application file and the stub library including the symbols exported from the shared library to a packaging device having the master application thereon for packaging the platform agnostic application file with the master application.

2. The method of claim 1, wherein the platform agnostic application file is capable of being used on multiple disparate platforms.

3. The method of claim 1, wherein accessing the shared library comprises accessing a plurality of libraries, and creating the stub library comprises stubbing one or more of the plurality of libraries.

4. The method of claim 1, wherein the stub library consists only of symbols exported from the stub library and is devoid of executable code.

5. The method of claim 1, wherein the stub library enables a linking tool to use the symbols exported from the shared library without the use of an SDK associated with the first platform.

6. The method of claim 1, further comprising compressing the platform agnostic application file.

7. The method of claim 1, wherein the platform agnostic application file is an extension file or plug-in to add functionality to the master application.

8. A method of packaging an application file with another application comprising:
   accessing, at a packaging computer, a platform agnostic application file comprising an application file combined with at least one stub library, wherein:
      the application file is created using a first platform on a file creation computer and is rendered platform agnostic by the at least one stub library, and the at least one stub library includes symbols exported from a shared library;
   unpacking, by the packaging computer, the platform agnostic application file;
   accessing, by the packaging computer, the at least one stub library from the platform agnostic application file, wherein the at least one stub library includes a stub generated from the symbols exported from one or more dependencies required when linking to the shared library on the file creation computer;
   accessing a master application created on a second platform lacking the shared library represented by the at least one stub library;
   packaging, by at least one processor of the packaging computer, using the second platform, the platform agnostic application file with the master application using the symbols contained in the at least one stub library to form an application package for delivery to a consumption computer, the master application being configured to utilize the platform agnostic application file as an extension file upon installation of the application package by the consumption computer; and
   providing, by the at least one processor of the packaging computer, the application package to the consumption computer that uses at least one platform that differs from one or more of the first platform or the second platform.

9. The method of claim 8, further comprising using, by the packaging computer, the symbols in the at least one stub library to link to the shared library without the use of a Software Development Kit (SDK) used on the first platform when creating the application file.

10. The method of claim 8, wherein packaging the platform agnostic application file with the master application renders the master application functional on at least the first platform, second platform, and the at least one platform.

11. The method of claim 8, wherein the extension file adds functionality to the master application when used by the consumption computer.

12. A non-transitory computer readable medium storing computer instructions that when executed by a processor of a file creation computer, cause the file creation computer to:
   create an application file using a first platform;
   access a shared library;
   identify one or more dependencies required when linking a master application created on a second platform to the shared library;
   generate a stub for each of the identified one or more dependencies;
   create a stub library, from the generated stubs, a stub library including symbols exported from the shared library for each of the identified one or more dependencies; and
   create a platform agnostic application file by combining the application file created using the first platform and the stub library comprising the symbols exported from the shared library with a master application created on a second platform that lacks the shared library, the platform agnostic application file facilitating packaging of the platform agnostic application file with the master application by a packaging computer lacking the shared library and using a platform other than the first platform.

13. A non-transitory computer readable medium storing computer instructions that when executed on a processor, cause the processor of a file creation computer using a first platform to perform a method comprising:
   creating an application file;
   accessing a shared library;
   identifying one or more dependencies required when linking a master application created on a second platform to the shared library;
   generating a stub for each of the identified one or more dependencies;
   creating a stub library, from the generated stubs, including symbols exported from the shared library for each of the identified one or more dependencies;
   combining the application file created using the first platform and the stub library including the symbols exported from the shared library into a platform agnostic application file that allows a packaging computer, using the second platform and lacking the shared library represented by the stub library, to package the platform agnostic application file with the master application; and
   providing the platform agnostic application file including the combined application file and the stub library including the symbols exported from the shared library to a packaging device having the master application thereon for packaging the platform agnostic application file with the master application.

14. The computer readable medium of claim 13, wherein the platform agnostic application file is capable of being used on multiple disparate platforms.

15. The computer readable medium of claim 13, wherein generating the stub for each of the identified one or more dependencies comprises generating a link with the master application.

16. A non-transitory computer readable medium storing computer instructions that when executed on a processor, cause the processor to perform a method comprising:
   accessing a platform agnostic application file comprising an application file combined at least one stub library and a non-stubbed library, wherein the application file is created using a first platform on a file creation computer and is rendered platform agnostic by the at least one stub library, and the at least one stub library includes symbols exported from a shared library;
   unpacking the platform agnostic application file;
   accessing the at least one stub library from the platform agnostic application file, wherein the at least one stub library includes a stub generated from the symbols exported from one or more dependencies required when linking to the shared library on the file creation computer;
   accessing a master application created on a second platform lacking the shared library represented by the at least one stub library;
   packaging, using the second platform, the platform agnostic application file with the master application using the symbols contained in the at least one stub library to form an application package for delivery to a consumption computer, the master application being configured to utilize the platform agnostic application file as an extension file upon installation of the application package by the consumption computer; and providing the application package to the consumption computer that uses at least one platform that differs from one or more of the first platform or the second platform.

17. The method of claim 8, wherein packaging, using the second platform, the platform agnostic application file with the master application does not require access to the shared library to complete the packaging process.

18. The method of claim 1, wherein the shared library is a library that is predetermined to be available to the master application on the application consumption computer.

19. The method of claim 1, wherein the first platform is an APPLE platform and the second platform is a WINDOWS platform.

20. The method of claim 1, wherein creating, by the file creation computer using the first platform, the application file comprises using a software development kit that the packaging computer does not have.

\* \* \* \* \*